United States Patent

Pieper

[11] 4,184,863
[45] Jan. 22, 1980

[54] GLASS MELTING FURNACE AND METHOD

[75] Inventor: Helmut Pieper, Lohr, Fed. Rep. of Germany

[73] Assignee: Sorg GmbH & Co. KG, Plochsbach, Fed. Rep. of Germany

[21] Appl. No.: 872,408

[22] Filed: Jan. 26, 1978

[30] Foreign Application Priority Data

Jan. 27, 1977 [DE] Fed. Rep. of Germany ....... 2703223

[51] Int. Cl.$^2$ ............................................. C03B 5/02
[52] U.S. Cl. ........................................... 65/135; 13/6
[58] Field of Search .................... 13/6, 23, 34; 65/135, 65/136, 337, 346, 347

[56] References Cited

U.S. PATENT DOCUMENTS

| | | | |
|---|---|---|---|
| 2,283,188 | 5/1942 | Cornelius | 13/6 |
| 2,691,689 | 10/1954 | Arbeit et al. | 13/6 X |
| 3,997,316 | 12/1976 | Koontz | 13/6 X |
| 4,012,218 | 3/1977 | Sorg et al. | 65/135 |

Primary Examiner—Roy N. Envall, Jr.
Attorney, Agent, or Firm—Sprung, Felfe, Horn, Lynch & Kramer

[57] ABSTRACT

A method for the melting of glass, wherein a layer or blanket of batch material is fed onto a bath of molten glass, the liquid glass is withdrawn from the bath in a lower position through an opening, and the batch material is subjected to thermal energy from above to melt said batch material providing passing the glass after the melting thereof in a vertically downwardly directed, non-turbulent stream, and additionally heating the glass in said stream by passing electric current therethrough until the final gas removal (refining) is obtained, whereupon the glass is further conducted in vertically downward direction, homogenized in the next lower zone without the supply of energy, and withdrawn from a lower point of said zone and a glass melting furnace for carrying out said method providing a depth of said refining section exceeding the depth of said melting section by about three times.

14 Claims, 4 Drawing Figures

GLASS MELTING FURNACE AND METHOD

The present invention relates to a method for the melting of glass, wherein a layer or blanket of batch material is fed onto a bath of molten glass, the liquid glass is withdrawn from the bath in a lower position through an opening, and the batch material is subjected to thermal energy from above to melt said batch material, as well as to a glass melting furnace for carrying out such method and comprising a melting tank heated from above by burners and including interconnected melting and refining sections with the batch material to be molten being fed to the surface of said sections, a bottom of said refining section which is at a level substantially lower than the bottom of said melting section, and a lateral outlet for the glass situated above the bottom of said refining portion.

Glass melting furnaces of a so-to-speak "conventional" type are known wherein the glass is molten and subsequently refined in side-by-side disposed refining and melting sections. Also, it is known to provide auxiliary electrodes in furnaces of this type. However, it has been found to be disadvantageous in these constructions that the efficiency of these furnaces in not satisfactory, that the quality of the molten glass at high rates of throughflow is frequently not satisfactory, either, and that, particularly, large-size furnaces having a great surface area of their molten bath pool or tank are required, such that the conventional furnaces, thus, are of low efficiency considered on volume basis.

The horizontal flow produced in glass melting furnaces of this type is difficult to control, and this flow results in that some glass portions enter the passage area after an extremely short period of dwell within the tank, thereby obviously affecting the efficiency of these tanks because these glass portions of short period of dwell still contain bubbles.

The above discussed drawbacks are present also in the abovementioned furnaces wherein a step is provided between the melting and refining sections (U.S. Pat. No. 2,123,544).

Furthermore, vertically operating, fully electrical glass melting furnaces are known in which the electrodes are arranged in a plurality of superposed levels. These prior furnaces suffer from the drawback that they are of special construction such that conversion of existing furnaces of well-known and conventionally heated type to provide such special furnaces is not possible. Furthermore, it is of disadvantage that these furnaces are operated with electric energy such that the consumption of possibly less expensive gas or oil is not possible therein and these furnaces are fully dependent on the supply of electric energy.

Accordingly, it is the object of the present invention to provide a method for the melting of glass as well as a glass melting furnace which do no longer suffer from the abovementioned drawbacks and which in particular allow to melt glass of high quality under cooperation of conventional heating facilities and electric energy, with such furnace providing a high efficiency on volume basis. More particularly, the method according to the invention should be suitable to convert existing, conventionally heated glass melting furnaces in such a way that these furnaces operate with a high fraction of electric energy with respect to the over-all energy-input, and to produce an improved glass quality with a substantial increase in performance. Additionally, it should thereby be ensured that these furnaces are adapted to be operated both with purely conventional heating media and with purely electrical heating means.

On the whole, the production of high-quality glass should be rendered more economical since the respective type of energy may be chosen in consideration of the cost thereof, and the construction of the furnace according to the invention should be possible in a particularly economical, ready and easy manner by making use of existing furnaces.

In accordance with the present invention, this object is solved in a method as outlined above, by passing the glass after the melting thereof in a vertically downwardly directed, non-turbulent stream, and additionally heating the glass in said stream by passing electric current therethrough until the final gas removal (refining) is obtained, whereupon the glass is further conducted in vertically downward direction, homogenized in the next lower zone without the supply of energy, and withdrawn from a lower point of said zone.

Thus, the glass is additionally heated in a horizontal zone by passing electric current therethrough, whereby the gas content of the glass is reduced to the required level in such zone. Below that horizontal zone to which energy is supplied, the glass is homogenized to be withdrawn thereupon. The electrodes provided in the refining section are arranged and connnected in such a fashion that any strong, downwardly directed flow cannot result; rather, the glass descends almost uniformly across the cross-section of the refining section. To this end, it is necessary that energy is concentrated in that portion of the refining section where the principal discharge flow would be present if no electrical heating system were provided.

Advantageously, the glass melting furnace for carrying out the method according to the invention is characterized in that said refining section has mounted therein below the level of said bottom of said melting section in one or more levels within a refining zone, electrodes for additionally electrically heating said glass, and that a homogenizing zone is provided therebelow.

Preferably and in order to obtain high-quality glass, the depth of the refining section may be about three times the depth of the melting section; this feature resulting in an economical structure of the furnace, too.

The surface area of the melting section may be greater than that of the refining section by up to three times, and preferably up to twice the surface area of the refining section. In order to obtain a high specific efficiency, the batch covers the surface of the molten bath pool preferably in the region both of the melting section and of the refining section, and electrical auxiliary heating means provided in the melting section prevent the temperature of the molten glass from being reduced by the dense batch cover or blanket.

below, an example of an embodiment according to the present invention is explained in greater detail by referring to the enclosed drawings, wherein.

The glass melting furnace according to the invention is constructed from refractory material in the conventional manner, with such refractory material being provided with, and supported by, a steel frame and insulated to the exterior. Above the glass melt or tank, an arched roof including burners in burner openings 6 is provided; both the arched roof and the brickwork including the steel frame are of conventional nature and subject to the expert's choice such that these structures need not be described in any greater detail herein. The conventional superstructure may be constructed in the same way as in a regenerative flame tank or in a regenerative, laterally heated tank or in a recuperative tank.

Figure 1:
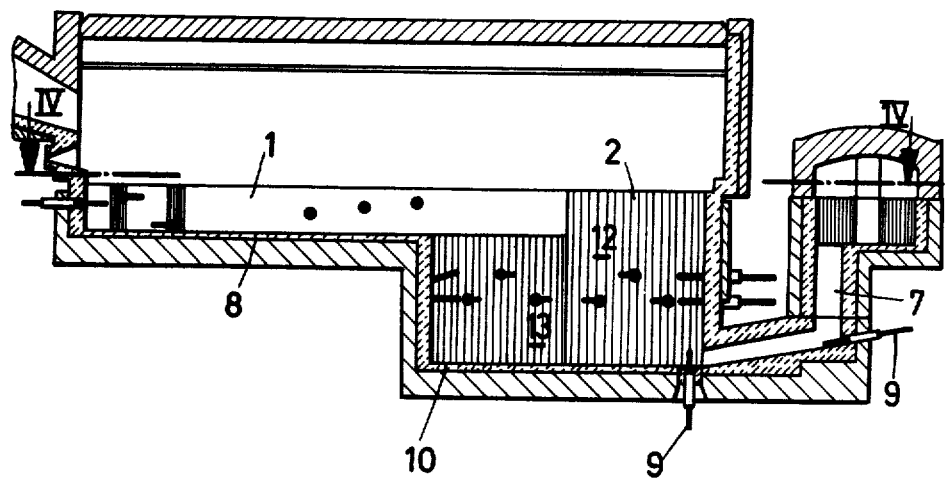
FIG. 1 is a vertical sectional view of a glass melting furnace according to the invention and having a hexagonal refining section.
Figure 2:
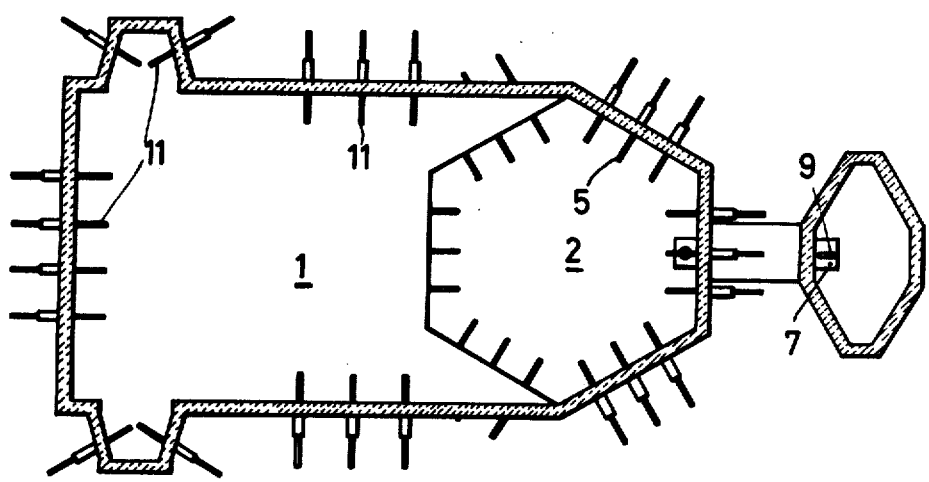
FIG. 2 is a horizontal sectional view along lines II—II of FIG. 1.
Figure 3:
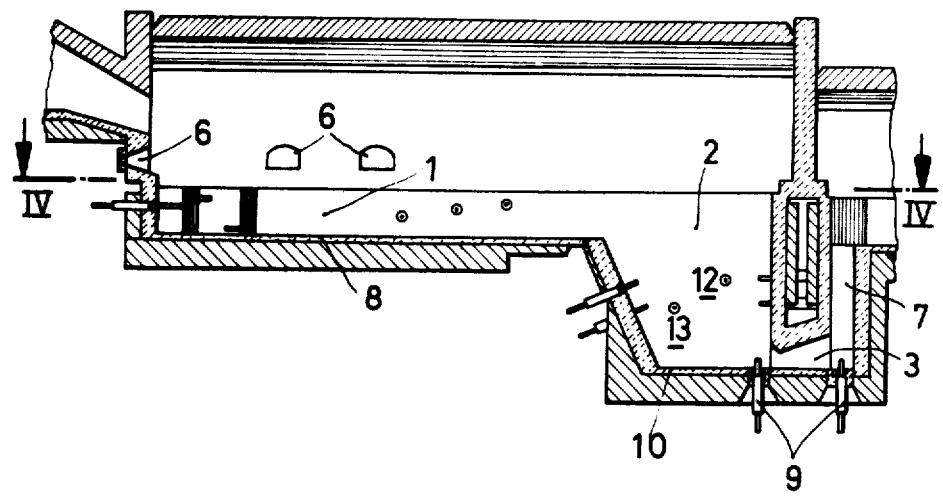
FIG. 3 is a vertical sectional view of a modified embodiment including a rectangular refining section.
Figure 4:
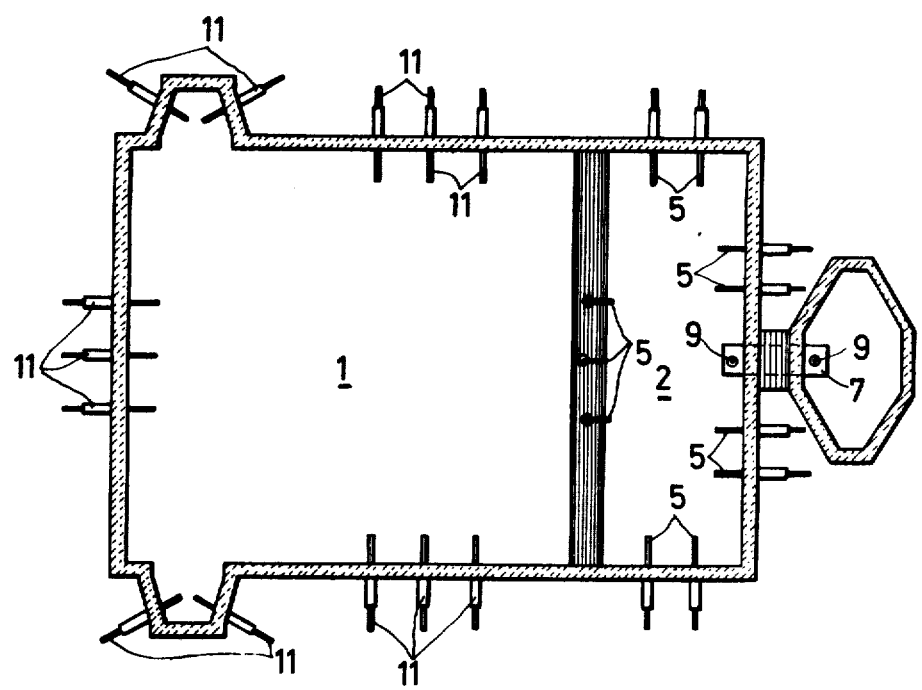
FIG. 4 is a horizontal sectional view along lines IV—IV of FIG. 3.

The glass melting furnace according to the invention includes a shallow melting section 1 and an adjacently situated, substantially deeper, hexagonal or rectangular refining section 2, said sections being interconnected such that molten glass flows from section 1 into section 2 without a reduction in cross-section as is clearly shown in FIGS. 1 and 3. In this case, the depth of the tank or molten glass bath in section 2 is by about two or three times greater than that in section 1, i.e. the bottom 10 of the refining section 2 is arranged by two to three times deeper than the bottom 8 of the melting section.

From the refining section 2, an outlet 3 leads to a riser 7, wherein energy is supplied to the stream of the discharged glass in conventional manner by auxiliary electrodes 9, such that the temperature of this stream is maintained or prevented from decreasing excessively.

The refining section 2 comprises an upper refining zone 12 and a lower refining zone 13, with a plurality of electrodes 5 being positioned within such refining zone 12. These electrodes 5 may be mounted in the sides both of the hexagonal and of the rectangular refining section 2, and according to a modified embodiment, but also as shown in the Figures, the electrodes may be positioned in two or more levels. The vertical position of the electrodes is selected such that these electrodes are in a plane below the bottom 8 of the melting section 1 or approximately at the level of bottom 8, respectively. The total surface of the molten glass bath may be covered by a blanket of batch material; however, it is also feasible to supply batch material to the surface of the melting section 1 only.

In most instances, the melting section 1 has a greater surface area than the refining section; and two thirds of the total surface area may be constituted by the melting section, while the refining section comprises one third of such surface area. Depending on the type of glass to be molten and on the specific efficiency of the furnace, these ratios may be varied as well; for example, the ratio of the surface areas of melting and refining sections also may be equal to 3:1 or 1:1, respectively.

Now, the method according to the invention is carried out as follows: The batch material supplied onto the total surface area of the molten glass bath is contacted from above with the combustion gases of the burners such that it is heated and molten both at the surface and at the interface between the batch material and the molten glass bath. The molten, unrefined glass flows from the melting section 1 into the refining section 2 where it is mixed with the glass molten in the latter section. Thereupon, the glass flows uniformly downwards through the refining zone 12 including the electrodes 5, whereby the glass is further heated and refined to descend into the homogenizing zone 13 disposed there below, so as to become homogenized therein. In zone 13, the temperature of the glass is slightly reduced, while the flow is without turbulence. A descent of unmolten batch material particles into zone 13 is positively prevented from occuring by the refining zone 12 including the electrodes 5.

The thus refined glass flows through outlet 3 to a transferring glass channel or passage 7 which may be formed as a riser.

Alternatively, the molten glass bath in the region of the refining section 2 may be left uncovered by the batch material, too. Although the specific efficiency of the furnace is reduced by this measure, it is thereby rendered possible to melt glass of a particularly high quality, or to produce special types of glass which are difficult to melt. In general, however, this measure will be unnecessary since the arrangement of the melting zone, of the electrodes in one level of the refining zone, and of the homogenizing zone one below the other provides for a sufficiently satisfactory refining action.

Evidently, the glass melting furnace according to the invention may be constructed in such a way that, in restoration of a conventional glass melting furnace, the refining section is made substantially deeper, and the electrodes 5 are mounted in said section. In this way, it is rendered possible that electromelting of glass may be performed even if it does not seem to be advisable or feasible to provide an entirely newly constructed, fully electrically operating glass melting furnace.

In a manner being surprising to the expert, it has been found that the molten glass, even in the case of glasses which are difficult to produce by melting, is not inferior in quality to glass molted by fully electrical means. Obviously, the glass melting furnace of the invention, depending on the cost of the various types of energy, may be operated in even more economical fashion than fully electrically operated glass melting furnaces; the operators of conventional glass melting furnaces are more familiar with the operation of this furnace, and the glass melting furnace according to the invention offers an ideal solution to the existing problems by its versatility.

What we claim is:

1. Method for melting glass comprising: (i) feeding batch material into a melting zone to form molten glass; (ii) passing the molten glass from the melting zone to a horizontally contiguous refining zone without a reduction in cross-section and then vertically downwardly therein in a non-tubulent stream; (iii) heating said stream in the refining zone by passing electrical energy therethrough until final gas removal is obtained; (iv) thereafter passing the refined glass to a homogenizing zone below the refining zone in a nonturbulent stream without passing electrical energy therethrough; and (iv) withdrawing the homogenized glass from a lower portion of the homogenizing zone.

2. Method of claim 1 wherein the molten glass is formed by passing electrical energy therethrough via a plurality of electrodes around the periphery of the melting zone.

3. Method of claim 1 wherein the molten glass is formed by applying thermal energy from above to melt said batch material.

4. Method of claim 1 wherein the molten glass passes from the melting zone to the refining zone in a substantially horizontal stream.

5. Glass melting furnace comprising: (i) a melting section having glass melting means and at least one batch feed inlet to feed batch material to be melted to the surface thereof; (ii) a horizontally contiguous refining section in liquid communication with the melting section without a reduction in cross-section and having a bottom at a level substantially lower than that of the melting section whereby molten glass flows from the melting section into the refining section and then vertically downwardly therein in a nonturbulent stream; (iv) an outlet disposed in the lower portion of the homogenizing section for withdrawing the glass; (v) and electrical heating means comprising electrodes in at least one level around the periphery of the refining section.

6. Furnace of claim 5 wherein the glass melting means in said melting section comprises burners to heat the batch material from above.

7. Furnace of claim 5 wherein the glass melting means in said melting section comprises electrodes around the periphery of the melting section.

8. Furnace of claim 5 wherein the electrodes of the electrical heating means are mounted in the refining section below the level of the bottom of said melting section.

9. Furnace of claim 5 wherein the depth of said refining section exceeds the depth of said melting section by about three times.

10. Furnace of claim 5 wherein the melting section has a surface area up to three times as great as the surface area of the refining section.

11. Furnace of claim 5 wherein auxiliary electrodes are provided within said outlet.

12. Furnace of claim 5 the surface of the molten glass in both of said melting and refining sections is covered by batch material.

13. Furnace of claim 5 wherein said refining section is hexagonal in cross-section.

14. Furnace of claim 5 wherein said refining section is rectangular in cross-section.

* * * * *